United States Patent
Yang

(10) Patent No.: US 12,305,764 B2
(45) Date of Patent: May 20, 2025

(54) TEMPERATURE-CONTROLLING VALVE ASSEMBLY

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 203 days.

(21) Appl. No.: 18/152,401

(22) Filed: Jan. 10, 2023

(65) Prior Publication Data

US 2024/0229938 A1     Jul. 11, 2024

(51) Int. Cl.
*F16K 1/52*     (2006.01)
*G05D 23/13*     (2006.01)

(52) U.S. Cl.
CPC .......... *F16K 1/523* (2013.01); *G05D 23/1346* (2013.01)

(58) Field of Classification Search
CPC .............. G05D 23/1346; G05D 23/13; G05D 23/1306; G05D 23/1313; F16K 11/00; F16K 11/02; F16K 11/04; F16K 1/523; Y10T 137/9464
USPC ......................................................... 137/801
See application file for complete search history.

(56) References Cited

U.S. PATENT DOCUMENTS

| | | | | |
|---|---|---|---|---|
| 3,827,016 A * | 7/1974 | Knapp | ................ | G05D 23/1346 137/625.37 |
| 7,770,808 B2 * | 8/2010 | Ruga | ................. | G05D 23/1353 236/100 |
| 8,899,491 B2 * | 12/2014 | Knapp | ................ | G05D 23/1353 236/100 |
| 10,527,180 B2 * | 1/2020 | Yang | ................... | F16K 11/0743 |
| 10,860,041 B2 * | 12/2020 | Lange | ..................... | E03C 1/041 |
| 11,662,752 B2 * | 5/2023 | Yang | ...................... | F16K 31/002 236/12.15 |
| 11,808,361 B2 * | 11/2023 | Yang | ....................... | E03C 1/023 |
| 12,092,234 B2 * | 9/2024 | Robin | .................. | F16K 19/006 |
| 2019/0227583 A1 * | 7/2019 | Jager | .................. | G05D 23/1346 |
| 2022/0034418 A1 * | 2/2022 | Medina | ................. | F16K 31/002 |

* cited by examiner

*Primary Examiner* — Daphne M Barry
(74) *Attorney, Agent, or Firm* — MUNCY, GEISSLER, OLDS & LOWE, P.C.

(57) ABSTRACT

A temperature-controlling valve assembly is provided, including: an adjusting member, configured to be screwed within a base of a controlling valve, an end of the adjusting member including a controlling portion, another end of the adjusting member including a receiving hole; an abutting member, slidably disposed in the receiving hole; a first elastic member, abutted between a bottom of the receiving hole and the abutting member to bias the abutting member toward a direction away from the controlling portion; and a blocking member, disposed in the receiving hole, a projection radially projecting inwardly around a periphery of the receiving hole, the blocking member being axially blocked by the projection so that the blocking member is non-disengageable from the receiving hole and the abutting member is blocked by the blocking member and non-disengageable from the receiving hole.

11 Claims, 5 Drawing Sheets

TEMPERATURE-CONTROLLING VALVE ASSEMBLY

BACKGROUND OF THE INVENTION

Field of the Invention

The present invention relates to a temperature-controlling valve assembly.

Description of the Prior Art

A controlling valve is used to control flow volumes of hot water and cold water to control the temperature of the outflow of water, wherein the control is achieved by the expansion or contraction of a temperature sensing rod of a valve member as the temperature sensing rod contacts the hot-cold mixed water. The conventional controlling valve includes an adjusting member, and the adjusting member includes an abutting member being slidable thereinside. The preset position and relative spatial condition of the valve member can be changed by turning the adjusting member to achieve the effect of temperature adjustment. Conventionally, to prevent the abutting member from disengaging from the adjusting member, a blocking member is inserted in the controlling valve through tight fit, so that the blocking member can block the abutting member to avoid separation. However, the inner wall of the adjusting member can be deformed by the pressing of the blocking member inserted in the controlling valve through tight fit. Long-term use can cause the blocking member to disengage from the adjusting member and cause the abutting member not smoothly slidable in the adjusting member, which results in malfunction of the controlling valve.

The present invention is, therefore, arisen to obviate or at least mitigate the above-mentioned disadvantages.

SUMMARY OF THE INVENTION

The main object of the present invention is to provide a temperature-controlling valve assembly which has a simple and stable assembled structure and is easy to manufacture.

To achieve the above and other objects, a temperature-controlling valve assembly is provided, including: an adjusting member, configured to be screwed within a base of a controlling valve, an end of the adjusting member including a controlling portion, another end of the adjusting member including a receiving hole; an abutting member, slidably disposed in the receiving hole; a first elastic member, abutted between a bottom of the receiving hole and the abutting member to bias the abutting member toward a direction away from the controlling portion; and a blocking member, disposed in the receiving hole, a projection radially projecting inwardly around a periphery of the receiving hole, the blocking member being axially blocked by the projection so that the blocking member is non-disengageable from the receiving hole and the abutting member is blocked by the blocking member and non-disengageable from the receiving hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
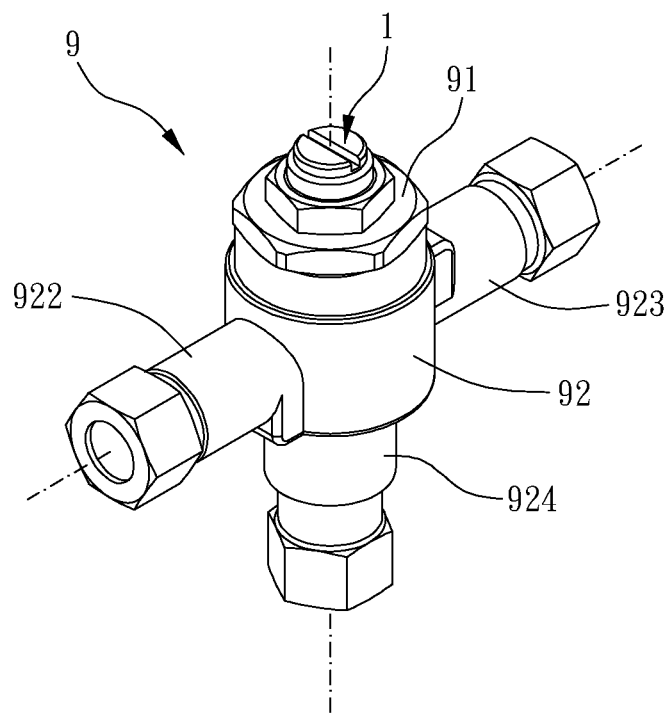
FIG. 1 is a stereogram of a preferable embodiment of the present invention.
Figure 2:
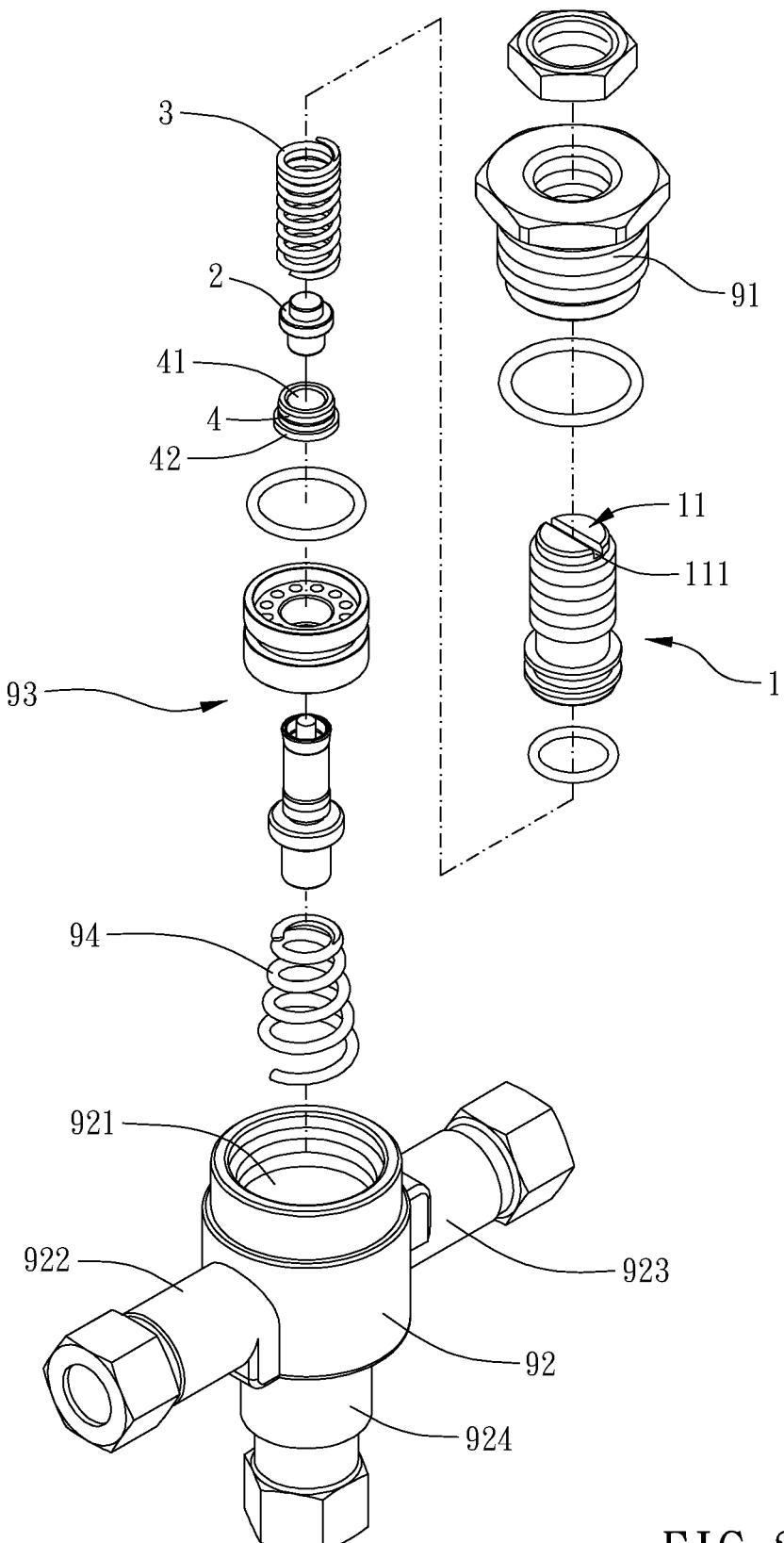
FIG. 2 is a breakdown drawing of a preferable embodiment of the present invention.
Figure 3:
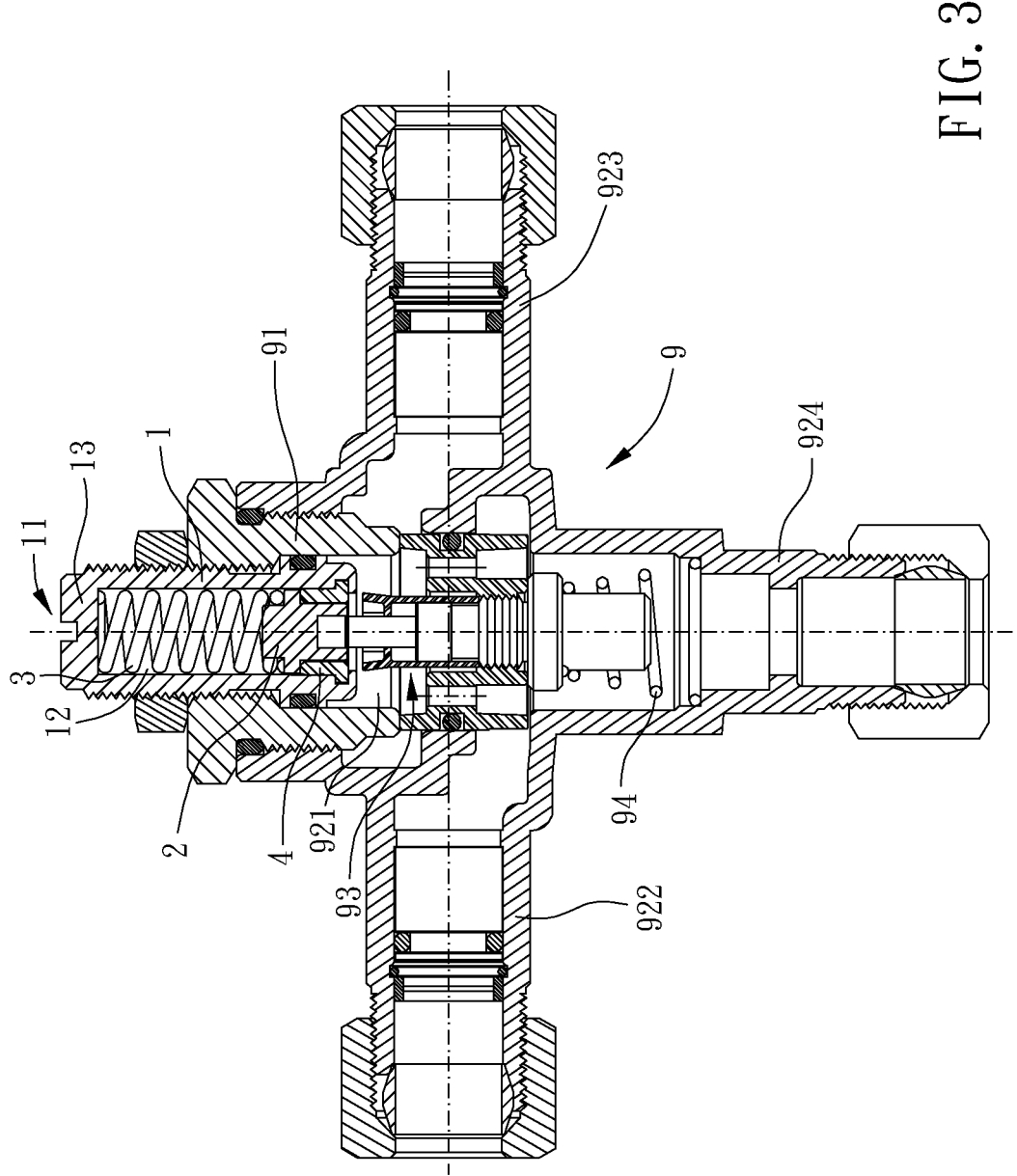
FIG. 3 is a cross-sectional view of a preferable embodiment of the present invention.
Figure 4:
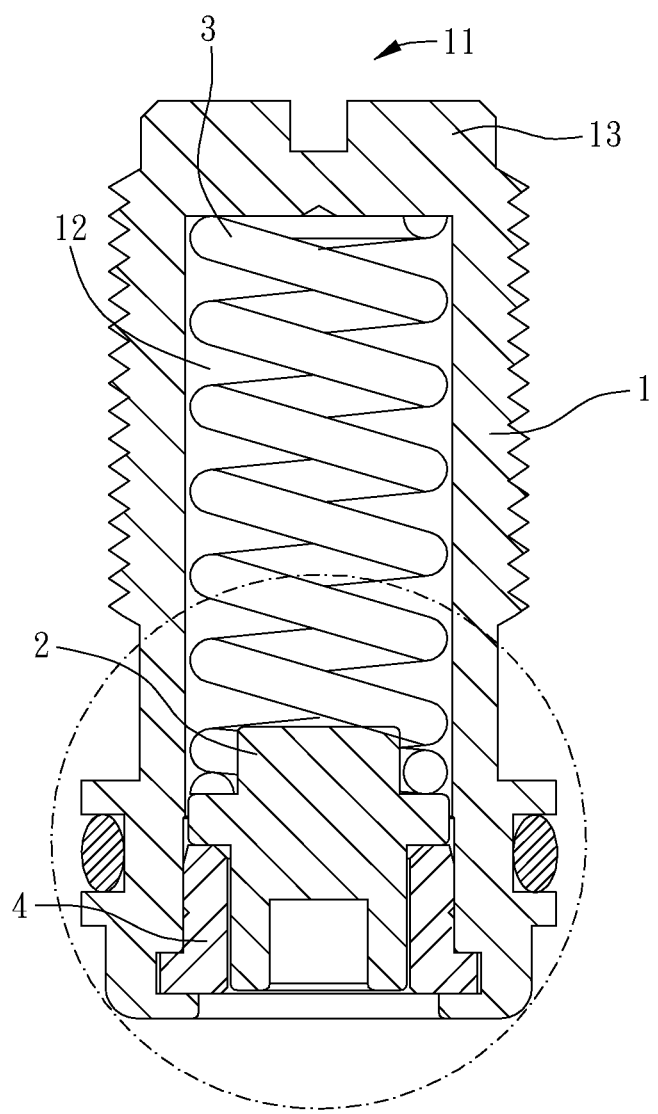
FIG. 4 is a partial enlarged cross-sectional view of a preferable embodiment of the present invention.
Figure 5:
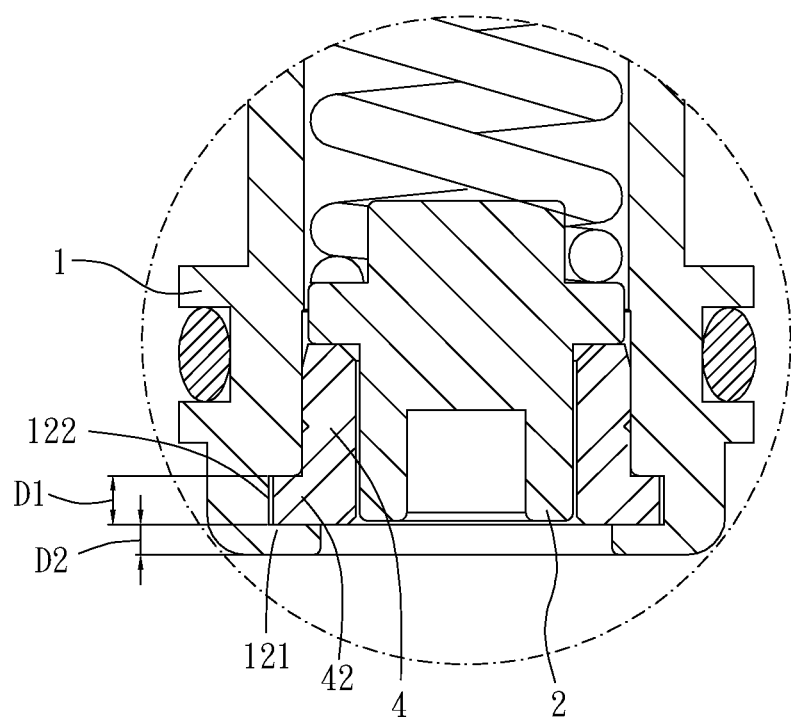
FIG. 5 is an enlargement of FIG. 4.

Please refer to FIGS. 1 to 5 for a preferable embodiment of the present invention. A temperature-controlling valve assembly of the present invention includes an adjusting member 1, an abutting member 2, a first elastic member 3 and a blocking member 4.

The adjusting member 1 is configured to be screwed within a base 91 of a controlling valve, an end of the adjusting member 1 includes a controlling portion 11, and another end of the adjusting member 1 includes a receiving hole 12.

The abutting member 2 is slidably disposed in the receiving hole 12.

The first elastic member 3 is abutted between a bottom of the receiving hole 12 and the abutting member 2 to bias the abutting member 2 toward a direction away from the controlling portion 11. In this embodiment, the adjusting member 1 further includes a top wall 13, the top wall 13 includes the bottom of the receiving hole 12, and the first elastic member 3 is abutted between the abutting member 2 and the top wall 13 to bias the abutting member 2 toward the direction away from the controlling portion 11.

The blocking member 4 is disposed in the receiving hole 12, a projection 121 projects inwardly around a periphery of the receiving hole 12, the blocking member 4 is axially blocked by the projection 121 so that the blocking member 4 is non-disengageable from the receiving hole 12 and the abutting member 2 is blocked by the blocking member 4 and non-disengageable from the receiving hole 12.

The controlling valve 9 further includes a mixing pipe 92, and the base 91 is configured to be assembled to the mixing pipe 92. The mixing pipe 92 includes a chamber 921, and the mixing pipe 92 further includes a first piping 922, a second piping 923 and a third piping 924 which are in communication with the chamber 921. An interior of the base 91 is in communication with the chamber 921, a valve member 93 and a second elastic member 94 are disposed in the chamber 921, and the second elastic member 94 biases the valve member 93 toward the abutting member 2. In this embodiment, the first piping 922 serves as a cold water inlet, the second piping 923 serves as a hot water inlet, and the third piping 924 serves as a mixed water outlet. When the valve member 93 is moved relative to the chamber 921 to adjust the overlapping area of the valve member 93 and the first and second pipings 922, 923 according to requirements, the cold water and hot water are mixed to provide an outflow with a stable temperature via the third piping 924.

The adjusting member 1 is rotatable to axially displace relative to the base 91 to adjust the abutting member 2 so that the position of the valve member 93 can be changed to vary the ratio of the cold water and hot water to control the temperature of the outflow.

In this embodiment, a projection 121 radially projects inwardly around a periphery of the receiving hole 12, the blocking member 4 is axially blocked by the projection 121 so that the blocking member 4 is restricted in the receiving hole 12.

Specifically, the blocking member 4 includes a through hole 41 disposed therethrough, and the abutting member 2 is movable to be partially within the through hole 41, and the valve member 93 extends into the through hole 41 to abut the abutting member 2.

Specifically, an end of the blocking member 4 remote from the controlling portion 11 includes a flange 42 extending radially, the flange 42 has a diametric dimension larger than a diametric dimension of the receiving hole 12, and the projection 121 is axially blocked by an end of the flange 42 remote from the controlling portion 11 so that the blocking member 4 is restricted in the receiving hole 12.

A portion of the blocking member 4 extending axially from the flange 42 has a diametric dimension smaller than the diametric dimension of the receiving hole 12. Preferably, an end of an inner wall of the receiving hole 12 remote from the controlling portion 11 includes an annular recess 122, the flange 42 is received within the annular recess 122, and the blocking member 4 is therefore positioned. Preferably, the flange 42 has a diametric dimension smaller than a diametric dimension of the annular recess 122 so that the blocking member 4 can be positioned by the projection 121.

When blocking member 4 is received within the receiving hole 12, it is to rivet a perimeter of the annular recess 122 to form the projection 121, which prevents the inner wall of the receiving hole 12 from being damaged by the blocking member 4 due to the urging of the blocking member 4.

The flange 42 has a thickness defined as a first distance D1, the projection 121 has a thickness defined as a second distance D2, and a ratio of the first distance D1 and the second distance D2 is 2:1 to 5:1 (3.5:1 in this embodiment, for example), so that the projection 121 has sufficient structural strength for blocking the blocking member 4.

Figure 6:
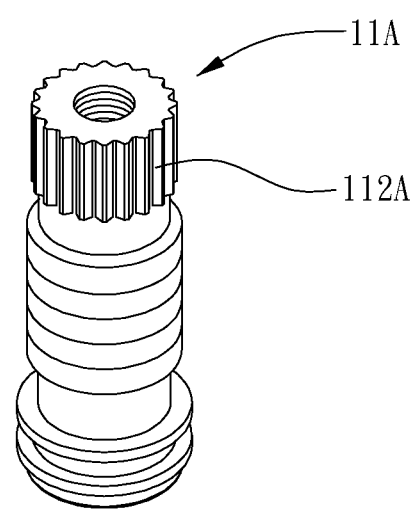
FIG. 6 is a stereogram of another preferable embodiment of the present invention.

In this embodiment, the controlling portion 11 includes an adjustment slot 111 which is non-circular and configured for reception of a screwdriver for driving the adjusting member 1. In other embodiments, the controlling portion 11A includes a splined head 112A for connection with a nut or knob having an assembling hole matching with the shape of the splined head 112A (FIG. 6), which is convenient for turning the controlling portion 11A.

Although particular embodiments of the invention have been described headed in detail for purposes of illustration, various modifications and enhancements may be made without departing from the spirit and scope of the invention. Accordingly, the invention is not to be limited except as by the appended claims.

What is claimed is:

1. A temperature-controlling valve assembly, including:
an adjusting member, being integrally formed of one piece, configured to be screwed within a base of a controlling valve, an end of the adjusting member including a controlling portion, another end of the adjusting member including a receiving hole and a projection radially projecting inwardly around a periphery of the receiving hole;
an abutting member, slidably disposed in the receiving hole;
a first elastic member, abutted between a bottom of the receiving hole and the abutting member to bias the abutting member toward a direction away from the controlling portion; and
a blocking member, disposed in the receiving hole, the blocking member being axially blocked by the projection so that the blocking member is non-disengageable from the receiving hole and the abutting member is blocked by the blocking member and non-disengageable from the receiving hole;
wherein the another end of the adjusting member further includes an annular recess which is rectangular and in communication with the receiving hole, an end of the blocking member remote from the controlling portion includes a flange extending radially, the flange is a rectangular and engaged with opposing sides of the annular recess, and the flange is radially gapped from a lateral side, between the opposing sides, of the annular recess;
wherein in a radial direction of the adjusting member, an extent of the projection is larger than an extent of the flange.

2. The temperature-controlling valve assembly of claim 1, wherein the blocking member includes a through hole disposed therethrough, and the abutting member is movable to be partially within the through hole.

3. The temperature-controlling valve assembly of claim 1, wherein the flange has a diametric dimension larger than a diametric dimension of the receiving hole, and the projection is axially blocked by an end of the flange remote from the controlling portion.

4. The temperature-controlling valve assembly of claim 3, wherein a portion of the blocking member extending axially from the flange has a diametric dimension smaller than the diametric dimension of the receiving hole.

5. The temperature-controlling valve assembly of claim 3, wherein an end of an inner wall of the receiving hole remote from the controlling portion includes the annular recess.

6. The temperature-controlling valve assembly of claim 5, wherein the flange has a diametric dimension smaller than a diametric dimension of the annular recess.

7. The temperature-controlling valve assembly of claim 3, wherein the flange has a thickness defined as a first distance, the projection has a thickness defined as a second distance, and a ratio of the first distance and the second distance is 2:1 to 5:1.

8. The temperature-controlling valve assembly of claim 1, wherein the adjusting member further includes a top wall, the top wall includes the bottom of the receiving hole, and the first elastic member is abutted between the abutting member and the top wall.

9. The temperature-controlling valve assembly of claim 1, wherein the controlling portion includes an adjustment slot which is non-circular.

10. The temperature-controlling valve assembly of claim 1, wherein the controlling portion includes a splined head.

11. The temperature-controlling valve assembly of claim 1, wherein the controlling valve further includes a mixing pipe, the base is configured to be assembled to the mixing pipe, the mixing pipe includes a chamber, the mixing pipe further includes a first piping, a second piping and a third piping which are in communication with the chamber, an interior of the base is in communication with the chamber, a valve member and a second elastic member are disposed in the chamber, and the second elastic member biases the valve member toward the abutting member.

* * * * *